US012607370B2

(12) United States Patent
Qiu et al.

(10) Patent No.: US 12,607,370 B2
(45) Date of Patent: Apr. 21, 2026

(54) METHOD AND APPARATUS FOR UNIT CONTROL AND PHOTOVOLTAIC MULTI-SPLIT AIR CONDITIONING SYSTEM

(71) Applicant: Gree Electric Appliances, Inc. of Zhuhai, Zhuhai (CN)

(72) Inventors: Tian Qiu, Zhuhai (CN); Mengmeng Jin, Zhuhai (CN); Lianfa Wu, Zhuhai (CN); Huachao Jiao, Zhuhai (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 138 days.

(21) Appl. No.: 18/720,779

(22) PCT Filed: Oct. 12, 2022

(86) PCT No.: PCT/CN2022/124741
§ 371 (c)(1),
(2) Date: Jun. 17, 2024

(87) PCT Pub. No.: WO2023/138113
PCT Pub. Date: Jul. 27, 2023

(65) Prior Publication Data
US 2025/0060117 A1 Feb. 20, 2025

(30) Foreign Application Priority Data
Jan. 24, 2022 (CN) .......................... 202210078432.9

(51) Int. Cl.
*F24F 5/00* (2006.01)
*F24F 11/64* (2018.01)
(Continued)

(52) U.S. Cl.
CPC ............ *F24F 5/0046* (2013.01); *F24F 11/64* (2018.01); *G05F 1/67* (2013.01); *H02J 3/381* (2013.01);
(Continued)

(58) Field of Classification Search
CPC .... F24F 11/89; F24F 11/65; F24F 2005/0067; F24F 5/0046; H02J 2300/26; H02J 3/46; H02J 2300/24; G05F 1/67
See application file for complete search history.

(56) References Cited

U.S. PATENT DOCUMENTS

2011/0222242 A1 9/2011 Thompson
2016/0131379 A1 5/2016 Hinokuma et al.

FOREIGN PATENT DOCUMENTS

CN 202470298 U 10/2012
CN 103855726 A 6/2014
(Continued)

OTHER PUBLICATIONS

EP 22921540, Extended European Search Report, Feb. 7, 2025.
(Continued)

*Primary Examiner* — Ana M Vazquez
(74) *Attorney, Agent, or Firm* — The Webb Law Firm

(57) ABSTRACT

The unit control method includes the following steps: detecting a temperature of an inverter module of a current unit according to a first preset period; and controlling a demand capacity of the current unit and a photovoltaic power supplied by the current unit not to be increased in a case where the temperature is not less than a first preset threshold.

18 Claims, 5 Drawing Sheets

(51) Int. Cl.
G05F 1/67 (2006.01)
H02J 3/38 (2026.01)
H02J 101/24 (2026.01)

(52) U.S. Cl.
CPC ... *F24F 2005/0067* (2013.01); *H02J 2101/24* (2026.01)

(56) References Cited

FOREIGN PATENT DOCUMENTS

| | | | | | |
|---|---|---|---|---|---|
| CN | 203787973 | U | | 8/2014 | |
| CN | 104104311 | B | | 4/2017 | |
| CN | 107388661 | A | | 11/2017 | |
| CN | 107528293 | A | | 12/2017 | |
| CN | 109888827 | A | | 6/2019 | |
| CN | 110567139 | A | * | 12/2019 | ............. F24F 11/88 |
| CN | 111174369 | A | | 5/2020 | |
| CN | 111174389 | A | | 5/2020 | |
| CN | 112467966 | A | | 3/2021 | |
| CN | 113007872 | A | | 6/2021 | |
| CN | 113108442 | A | | 7/2021 | |
| CN | 113489429 | A | | 10/2021 | |
| CN | 114413447 | A | | 4/2022 | |

OTHER PUBLICATIONS

CN 202210078432.9, First Office Action and Search Report, Sep. 21, 2022.
PCT/CN2022/124741, International Search Report, Dec. 22, 2022.
PCT/CN2022/124741, Written Opinion of the International Searching Authority, Dec. 22, 2022.

* cited by examiner

METHOD AND APPARATUS FOR UNIT CONTROL AND PHOTOVOLTAIC MULTI-SPLIT AIR CONDITIONING SYSTEM

CROSS-REFERENCE TO RELATED APPLICATIONS

The application is the United States national phase of International Patent Application No. PCT/CN2022/124741, filed Oct. 12, 2022, and claims priority to Chinese Patent Application No. 202210078432.9, filed Jan. 24, 2020, the disclosures of which are hereby incorporated by reference in their entireties.

BACKGROUND OF THE INVENTION

Field Of The Invention

The present disclosure relates to the field of air conditioning, in particular to a unit control method and apparatus and a photovoltaic multi-split air conditioning system.

Description Of Related Art

In a case where the photovoltaic multi-split air conditioner is in high temperature environment or high load condition, the temperature of the inverter module of the unit is often high, which seriously affects the reliability of the unit. In the related technology, in a case where the temperature of the inverter module of the unit is too high, the actual operating load of the unit and the operating frequency of the compressor are usually reduced to protect the unit.

SUMMARY OF THE INVENTION

According to a first aspect of an embodiment of the present disclosure, a unit control method is provided, comprising: detecting a temperature of an inverter module of a current unit at a first preset period; and controlling a demand capacity of the current unit and a photovoltaic power supplied by the current unit not to be increased in a case where the temperature is not less than a first preset threshold.

In some embodiments, determining whether the temperature is less than a second preset threshold, wherein the second preset threshold is greater than the first preset threshold; controlling the demand capacity of the current unit and the photovoltaic power supplied by the current unit not to be increased in a case where the temperature is less than the second preset threshold; and distributing a load increment to other units in an operating state except the current unit in a multi-split system in a case where there is the load increment in the multi-split system.

In some embodiments, determining whether the temperature is less than a third preset threshold in a case where the temperature is not less than the second preset threshold, wherein the third preset threshold is greater than the second preset threshold; and reducing at least one of the demand capacity of the current unit or the photovoltaic power supplied by the current unit based on a preset ratio at a second preset period in a case where the temperature is less than the third preset threshold.

In some embodiments, determining whether a electrical power of the current unit is 0; and reducing the photovoltaic power supplied by the current unit based on the preset ratio at the second preset period in a case where the electrical power of the current unit is 0.

In some embodiments, determining whether the photovoltaic power supplied by the current unit is 0 in a case where the electrical power of the current unit is not 0; and reducing the demand capacity of the current unit based on a preset ratio at the second preset period in a case where the photovoltaic power supplied by the current unit is 0.

In some embodiments, determining whether the photovoltaic power supplied by the current unit is greater than the electrical power of the current unit in a case where the photovoltaic power supplied by the current unit is not 0; and reducing the photovoltaic power supplied by the current unit based on a preset ratio at the second preset period in a case where the photovoltaic power supplied by the current unit is greater than the electrical power of the current unit.

In some embodiments, determining whether the photovoltaic power supplied by the current unit is less than the electrical power of the current unit in a case where the photovoltaic power supplied by the current unit is not greater than the electrical power of the current unit; and reducing the demand capacity of the current unit based on a preset ratio at the second preset period in a case where the photovoltaic power supplied by the current unit is less than the electrical power of the current unit.

In some embodiments, reducing the demand capacity of the current unit and the photovoltaic power supplied by the current unit based on a preset ratio at the second preset period in a case where the photovoltaic power supplied by the current unit is equal to the electrical power of the current unit.

In some embodiments, distributing a decrement of the demand capacity of the current unit to other units in the operating state except the current unit in the multi-split system based on a unit capacity ratio.

In some embodiments, determining whether all units in the multi-split system are in the operating state in a case where the temperature is not less than the third preset threshold; and shutting down the current unit, and prohibiting the current unit from starting up within a preset time range in a case where the all units in the multi-split system are in the operating state.

In some embodiments, distributing a demand capacity of the current unit before shutdown to units in the operating state in the multi-split system based on the unit capacity ratio.

In some embodiments, shutting down the current unit, and prohibiting the current unit from starting up within a preset time range in a case where part units in the multi-split system are in a standby state; selecting a unit among units in the standby state as a target unit; and starting up the target unit to replace the current unit, and redistributing a total demand capacity in the multi-split system after the target unit is started up.

According to a second aspect of an embodiment of the present disclosure, there is provided a unit control apparatus, comprising: a first processing module configured to detect a temperature of an inverter module of a current unit at a first preset period; and a second processing module configured to control a demand capacity of the current unit and a photovoltaic power supplied by the current unit not to be increased in a case where the temperature is not less than a first preset threshold.

In some embodiments, the second processing module is configured to determine whether the temperature is less than a second preset threshold, wherein the second preset threshold is greater than the first preset threshold, control the demand capacity of the current unit and the photovoltaic power supplied by the current unit not to be increased in a case where the temperature is less than the second preset threshold, and distribute a load increment to other units in an operating state except the current unit in a multi-split system in a case where there is the load increment in the multi-split system.

In some embodiments, the second processing module is configured to determine whether the temperature is less than a third preset threshold in a case where the temperature is not less than the second preset threshold, wherein the third preset threshold is greater than the second preset threshold; and reduce at least one of the demand capacity of the current unit or the photovoltaic power supplied by the current unit based on a preset ratio at a second preset period in a case where the temperature is less than the third preset threshold.

In some embodiments, the second processing module is configured to determine whether a electrical power of the current unit is 0, and reduce the photovoltaic power supplied by the current unit based on the preset ratio at the second preset period in a case where the electrical power of the current unit is 0.

In some embodiments, the second processing module is configured to determine whether the photovoltaic power supplied by the current unit is 0 in a case where the electrical power of the current unit is not 0, and reduce the demand power of the current unit based on a preset ratio at the second preset period in a case where the photovoltaic power supplied by the current unit is 0.

In some embodiments, the second processing module is configured to determine whether the photovoltaic power supplied by the current unit is greater than the electrical power of the current unit in a case where the photovoltaic power supplied by the current unit is not 0, and reduce the photovoltaic power supplied by the current unit based on a preset ratio at the second preset period in a case where the photovoltaic power supplied by the current unit is greater than the electrical power of the current unit.

In some embodiments, the second processing module is configured to determine whether the photovoltaic power supplied by the current unit is less than the electrical power of the current unit in a case where the photovoltaic power supplied by the current unit is not greater than the electrical power of the current unit, and reduce the demand capacity of the current unit based on a preset ratio at the second preset period in a case where the photovoltaic power supplied by the current unit is less than the electrical power of the current unit.

In some embodiments, the second processing module is configured to reduce the demand capacity of the current unit and the photovoltaic power supplied by the current unit based on a preset ratio at the second preset period in a case where the photovoltaic power supplied by the current unit is equal to the electrical power of the current unit.

In some embodiments, the second processing module is configured to distribute a decrement of the demand capacity of the current unit to other units in the operating state except the current unit in the multi-split system based on a unit capacity ratio.

In some embodiments, the second processing module is configured to determine whether all units in the multi-split system are in the operating state in a case where the temperature is not less than the third preset threshold, and shut down the current unit, and prohibit the current unit from starting up within a preset time range in a case where the all units in the multi-split system are in the operating state.

In some embodiments, the second processing module is configured to distribute a demand capacity of the current unit before shutdown to units in the operating state in the multi-split system based on the unit capacity ratio.

In some embodiments, the second processing module is configured to shut down the current unit, and prohibiting the current unit from starting up within a preset time range in a case where part units in the multi-split system are in a standby state, select a unit among units in the standby state as a target unit, and start up the target unit to replace the current unit, and redistribute a total demand capacity in the multi-split system after the target unit is started up.

According to a third aspect of an embodiment of the present disclosure, there is provided a unit control apparatus, comprising: a processor; and a memory coupled to the processor, storing program instructions which, when executed by the processor, cause the processor to implement the unit control method according to any one of the above embodiments.

According to a fourth aspect of an embodiment of the present disclosure, there is provided a photovoltaic multi-split air conditioning system, comprising the unit control apparatus according to any one of the above embodiments.

According to a fifth aspect of an embodiment of the present disclosure, a computer-readable storage medium is provided, wherein the computer-readable storage medium stores computer instructions, which, when executed by a processor, implement the method as described in any one of the above embodiments.

Other features and advantages of the present disclosure will become clear through detailed descriptions of the illustrative embodiments of the present disclosure with reference to the following accompanying drawings.

BRIEF DESCRIPTION OF THE DRAWINGS

The accompanying drawings that form a part of the description describe the embodiments of the present disclosure, and are used to explain the principle of the present disclosure together with the description.

The present disclosure can be comprehended more clearly with reference to the accompanying drawings and according to the following detailed descriptions, wherein.

It shall be understood that the various parts shown in the accompanying drawings are not drawn in sizes according to actual proportional relations. In addition, the same or similar reference numerals indicate the same or similar components.

DESCRIPTION OF THE INVENTION

Various illustrative embodiments of the present disclosure will now be described in details with reference to the accompanying drawings. The descriptions of the illustrative embodiments are only illustrative, but shall not serve as limitations on the present disclosure and its application or utilization. The present disclosure can be implemented in many different forms and is not limited to the embodiments described herein. These embodiments are provided to make the present disclosure thorough and complete, and to fully express the scope of the present disclosure to those skilled in the art. It should be noted that unless otherwise illustrated, the relative arrangements of the components and steps, the components of the materials, and values set forth in these embodiments are to be construed as illustrative only and not as a limitation.

Similar words such as "include" or "comprise" and the like used in the present disclosure mean that the elements preceding the word contain the elements listed after the word, and do not exclude the possibility of containing other elements.

All terms (including technical or scientific terms) used in the present disclosure have the same meaning as those understood by one ordinary skilled in the art to which the present disclosure belongs, unless specifically defined otherwise. It shall be further understood that, the terms as defined in a common dictionary shall be interpreted as having meanings consistent with those in the context of the relevant technique, instead of being interpreted with an idealistic or extremely formalized meaning, unless it is explicitly defined here.

Techniques, methods and devices that have already been known to ordinary skilled in the art may not be discussed here in details, but under suitable circumstances, the techniques, methods and devices shall be deemed as parts of the description.

The inventors found that the output of the unit would be reduced under a condition that the actual operating load of the unit and the operating frequency of the compressor are reduced. This approach of ensuring the reliability of the unit by sacrificing the performance of the unit will reduce the user experience.

Accordingly, the present disclosure provides a unit control solution, which can ensure the reliability of the unit without affecting the performance of the unit, thus improving the user experience.

Figure 1:
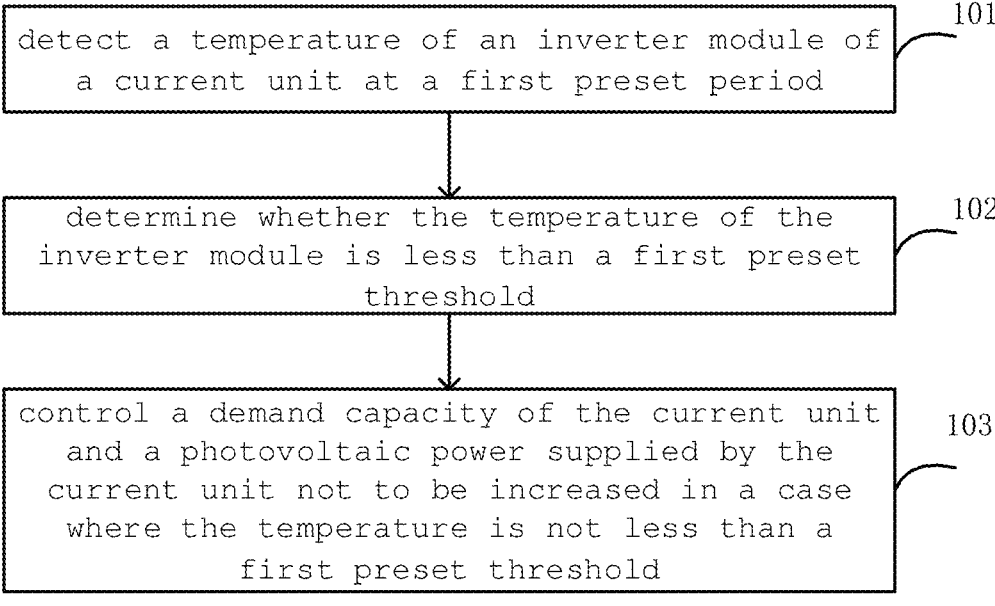
FIG. 1 is a flow diagram of a unit control method according to one embodiment of the present disclosure.

FIG. 1 is a flow diagram of a unit control method according to one embodiment of the present disclosure. In some embodiments, the following unit control method is performed by a unit control apparatus.

In step 101, a temperature of an inverter module of a current unit is detected at a first preset period.

In step 102, it is determined whether the temperature of the inverter module is less than a first preset threshold.

In step 103, a demand capacity of the current unit and a photovoltaic power supplied by the current unit is controlled not to be increased in a case where the temperature is not less than a first preset threshold.

For example, the demand capacity of the current unit and the photovoltaic power supplied by the current unit are controlled to remain unchanged, or at least one of the demand capacity of the current unit or the photovoltaic power supplied by the current unit is controlled to be reduced according to a preset ratio.

In some embodiments, in a case where the temperature of the inverter module is less than the first preset threshold, routine control is performed on the unit. Since routine control of the unit is not the inventive point of the present disclosure, it is not described here.

In the unit control method provided by the above embodiment of the present disclosure, in a case where the temperature of the inverter module of the current unit is not less than the preset threshold, the demand capacity of the current unit and the photovoltaic power supplied by the current unit are controlled not to be increased, thus ensuring the reliability of the unit without affecting the performance of the unit and effectively improving the user experience.

Figure 2:
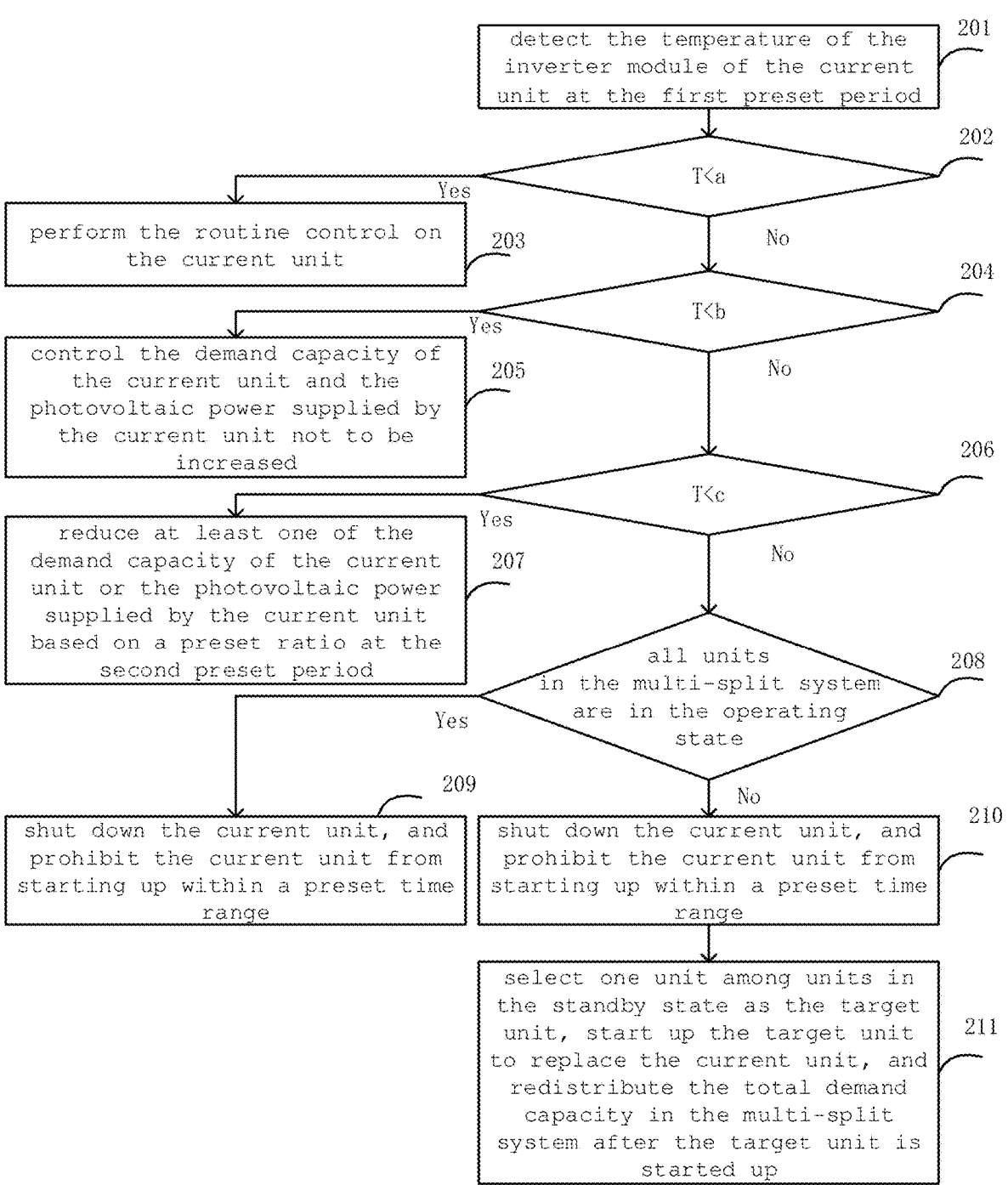
FIG. 2 is a flow diagram of a unit control method according to another embodiment of the present disclosure.

FIG. 2 is a flow diagram of a unit control method according to another embodiment of the present disclosure. In some embodiments, the following unit control method is performed by the unit control apparatus.

In step 201, the temperature of the inverter module of the current unit is detected at the first preset period.

In step 202, it is determined whether the temperature of the inverter module is less than a first preset threshold a.

If the temperature of the inverter module is less than the first preset threshold a, that is, the temperature T of the inverter module satisfies T<a, step 203 is executed. If the temperature of the inverter module is not less than the first preset threshold a, step 204 is executed.

In step 203, the routine control is performed on the current unit.

In step 204, it is determined whether the temperature of the inverter module is less than a second preset threshold b, wherein the second preset threshold b is greater than the first preset threshold a.

If the temperature of the inverter module is less than the second preset threshold b, that is, the temperature T of the inverter module satisfies: a≤T<b, then step 205 is executed; if the temperature of the inverter module is not less than the second preset threshold, step 206 is executed.

In step 205, the demand capacity of the current unit and the photovoltaic power supplied by the current unit are controlled not to be increased.

For example, the demand capacity of the current unit and the photovoltaic power supplied by the current unit are controlled to remain unchanged.

In some embodiments, in a case where there is the load increment in the multi-split system, the load increment is distributed to other units in an operating state except the current unit in a multi-split system. Therefore, the total demand capacity of the system is kept unchanged while controlling the temperature of the inverter module.

In step 206, it is determined whether the temperature of the inverter module is less than a third preset threshold c, wherein the third preset threshold c is greater than the second preset threshold b.

If the temperature of the inverter module is less than the third preset threshold c, that is, the temperature T of the inverter module satisfies: b≤T<c, then step 207 is executed; if the temperature of the inverter module is not less than the third preset threshold c, that is, the temperature T of the inverter module satisfies T>c, step 208 is executed.

In step 207, at least one of the demand capacity of the current unit or the photovoltaic power supplied by the current unit is reduced based on a preset ratio at the second preset period.

Figure 3:
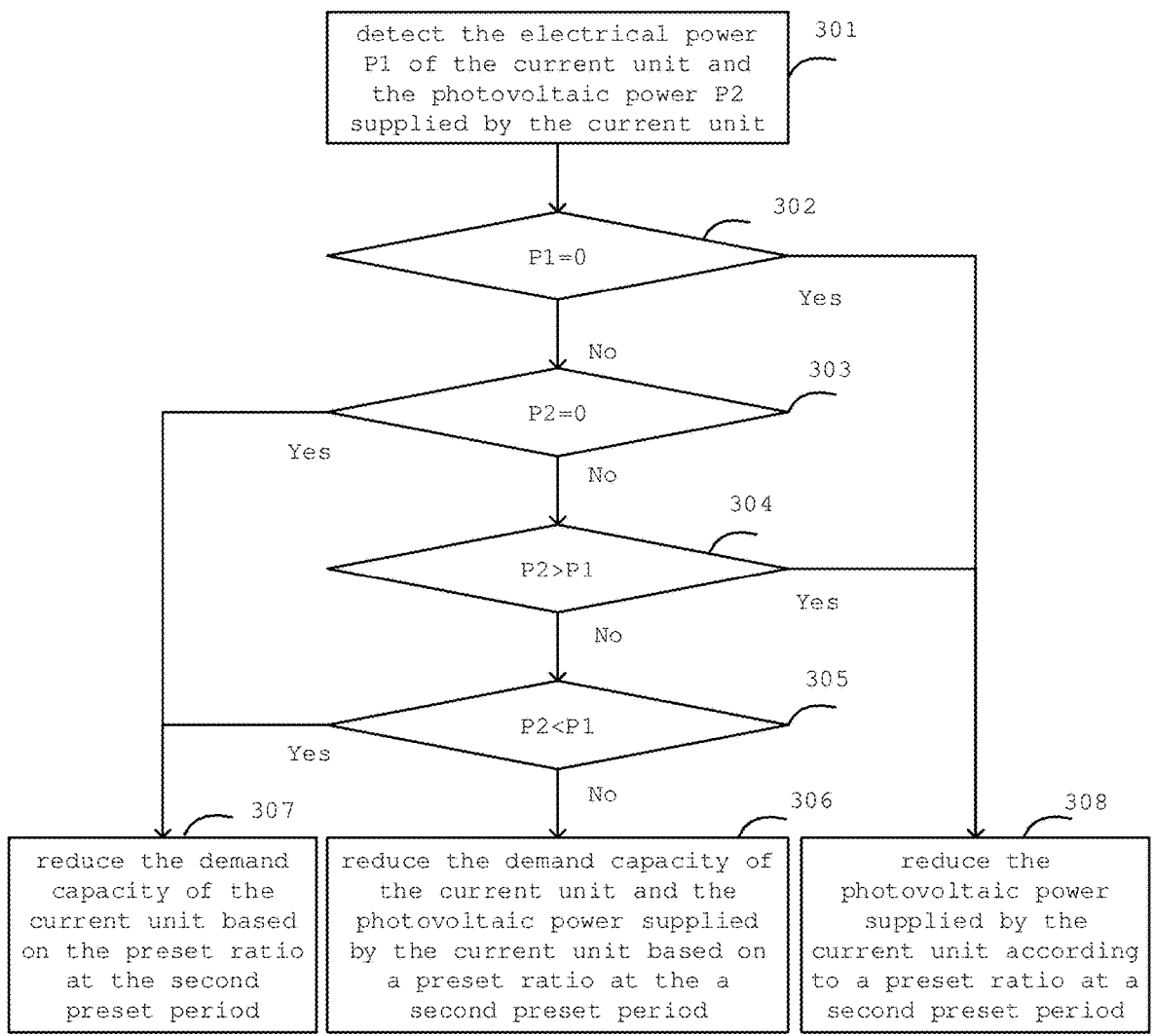
FIG. 3 is a flow diagram of a unit control method according to still another embodiment of the present disclosure.

Step 207 will be illustrated by FIG. 3.

In step 208, it is determined whether all units in the multi-split system are in the operating state.

If all units in the multi-split system are in the operating state, step 209 will be executed; if part units in the multi-split system are in the standby state, step 210 is executed.

In step 209, the current unit is shut down, and the current unit is prohibited from starting up within a preset time range.

In some embodiments, the demand capacity of the current unit before shutdown is distributed to the units in the operating state in the multi-split system according to the unit capacity ratio, thus ensuring that the total demand capacity of the system remains unchanged.

In step 210, the current unit is shut down, and the current unit is prohibited from starting up within a preset time range.

In step 211, one unit among units in the standby state is selected as the target unit, the target unit is started up to replace the current unit, and the total demand capacity is redistributed in the multi-split system after the target unit is started up.

FIG. 3 is a flow diagram of a unit control method according to still another embodiment of the present disclosure. In some embodiments, the following unit control method is executed by the unit control apparatus. In some embodiments, the above step 208 is as follows:

In step 301, the electrical power P1 of the current unit and the photovoltaic power P2 supplied by the current unit are detected.

In step 302, it is determined whether the electrical power P1 of the current unit is 0.

If P1=0, step 308 is executed; if P1≠0, step 303 is executed.

It should be noted that if P1=0, it indicates that the current unit is in a pure photovoltaic electricity generation mode.

In step 303, it is determined whether the photovoltaic power P2 supplied by the current unit is 0.

If P2=0, step 307 is executed; if P2≠0, step 304 is executed.

It should be noted that if P2=0, it indicates that the current unit is in a pure air conditioning mode, and the electric energy used is completely provided by an AC power grid.

In step 304, it is determined whether the photovoltaic power P2 supplied by the current unit is greater than the electrical power P1 of the current unit.

If P2>P1, step 308 is executed; otherwise, step 305 is executed.

It should be noted that if P2>P1, it indicates that the current unit is in an electricity generation mode of the photovoltaic air conditioning system, that is, the photovoltaic power supply not only supplies power to the air conditioning unit, but also provides power for the AC power grid or charges the energy storage equipment.

In step 305, it is determined whether the photovoltaic power P2 supplied by the current unit is less than the electrical power P1 of the current unit.

If P2<P1, step 307 is executed; if P2=P1, step 306 is executed.

It should be noted that if P2<P1, it indicates that the current unit is in the electricity consumption mode of the photovoltaic air conditioning system, that is, photovoltaic power supply and AC power supply simultaneously supply power to the air conditioning unit.

If P2=P1, it indicates that the current unit is in the photovoltaic air conditioning mode, that is, the photovoltaic power supply is just used to supply power to the air conditioning unit, and there is no need to use AC power supply.

In step 306, the demand capacity of the current unit and the photovoltaic power supplied by the current unit are reduced based on a preset ratio at the a second preset period.

In some embodiments, the decrement of the demand capacity of the current unit is distributed to other units in the operating state except the current unit in the multi-split system according to the unit capacity ratio, so as to ensure that the total demand capacity of the system remains unchanged.

In step 307, the demand capacity of the current unit is reduced based on the preset ratio at the second preset period.

In some embodiments, the decrement of the demand capacity of the current unit is distributed to other units in the operating state except the current unit in the multi-split system according to the unit capacity ratio, so as to ensure that the total demand capacity of the system remains unchanged.

In step 308, the photovoltaic power supplied by the current unit is reduced according to a preset ratio at a second preset period, so as to meet the needs of users while ensuring the reliability of the unit.

Figure 4:
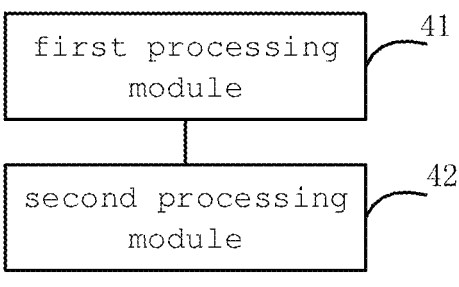
FIG. 4 is a schematic structural diagram of a unit control apparatus according to one embodiment of the present disclosure.

FIG. 4 is a schematic structural diagram of a unit control apparatus according to one embodiment of the present disclosure. As shown in FIG. 4, the unit control apparatus includes a first processing module 41 and a second processing module 42.

The first processing module 41 is configured to detect a temperature of an inverter module of a current unit at a first preset period.

The second processing module 42 is configured to determine whether the temperature is less than a first preset threshold, and control a demand capacity of the current unit and a photovoltaic power supplied by the current unit not to be increased in a case where the temperature is not less than a first preset threshold.

For example, the demand capacity of the current unit and the photovoltaic power supplied by the current unit are controlled to remain unchanged, or at least one of the demand capacity of the current unit or the photovoltaic power supplied by the current unit is controlled to reduce according to a preset ratio.

In the unit control apparatus provided by the above embodiment of the present disclosure, when the temperature of the inverter module of the current unit is not less than the preset threshold, the demand capacity of the current unit and the photovoltaic power supplied by the current unit are controlled not to increase, so as to ensure the reliability of the unit without affecting the performance of the unit, and effectively improve the user experience.

In some embodiments, the second processing module 42 is configured to determine whether the temperature is less than a second preset threshold, wherein the second preset threshold is greater than the first preset threshold, control the demand capacity of the current unit and the photovoltaic power supplied by the current unit not to be increased in a case where the temperature is less than the second preset threshold. For example, the demand capacity of the current unit and the photovoltaic power supplied by the current unit are controlled to remain unchanged, and distribute a load increment to other units in an operating state except the current unit in a multi-split system in a case where there is the load increment in the multi-split system.

In some embodiments, the second processing module 42 is configured to whether the temperature is less than a third preset threshold in a case where the temperature is not less than the second preset threshold, wherein the third preset threshold is greater than the second preset threshold; and reduce at least one of the demand capacity of the current unit or the photovoltaic power supplied by the current unit based on a preset ratio at a second preset period in a case where the temperature is less than the third preset threshold.

In some embodiments, the second processing module 42 is configured to determine whether a electrical power of the current unit is 0, and reduce the photovoltaic power supplied by the current unit based on the preset ratio at the second preset period in a case where the electrical power of the current unit is 0.

In some embodiments, the second processing module 42 is configured to determine whether the photovoltaic power supplied by the current unit is 0 in a case where the electrical power of the current unit is not 0, and reduce the demand capacity of the current unit based on a preset ratio at the second preset period in a case where the photovoltaic power supplied by the current unit is 0.

In some embodiments, the second processing module 42 is configured to determine whether the photovoltaic power supplied by the current unit is greater than the electrical power of the current unit in a case where the photovoltaic power supplied by the current unit is not 0, and reduce the photovoltaic power supplied by the current unit based on a preset ratio at the second preset period in a case where the photovoltaic power supplied by the current unit is greater than the electrical power of the current unit.

In some embodiments, the second processing module 42 is configured to determine whether the photovoltaic power supplied by the current unit is less than the electrical power of the current unit in a case where the photovoltaic power supplied by the current unit is not greater than the electrical power of the current unit, and reduce the demand capacity of the current unit based on a preset ratio at the second preset period in a case where the photovoltaic power supplied by the current unit is less than the electrical power of the current unit.

In some embodiments, the second processing module 42 is configured to reduce the demand capacity of the current unit and the photovoltaic power supplied by the current unit based on a preset ratio at the second preset period in a case where the photovoltaic power supplied by the current unit is equal to the electrical power of the current unit.

In some embodiments, the second processing module 42 is configured to distribute a decrement of the demand capacity of the current unit to other units in the operating state except the current unit in the multi-split system based on a unit capacity ratio.

In some embodiments, the second processing module 42 is configured to determine whether all units in the multi-split system are in the operating state in a case where the temperature is not less than the third preset threshold, and shut down the current unit, and prohibit the current unit from starting up within a preset time range in a case where the all units in the multi-split system are in the operating state.

In some embodiments, the second processing module 42 is configured to distribute a demand capacity of the current unit before shutdown to units in the operating state in the multi-split system based on the unit capacity ratio.

In some embodiments, the second processing module 42 is configured to shut down the current unit, and prohibiting the current unit from starting up within a preset time range in a case where part units in the multi-split system are in a standby state, select a unit among units in the standby state as a target unit, and start up the target unit to replace the current unit, and redistribute a total demand capacity in the multi-split system after the target unit is started up.

Figure 5:
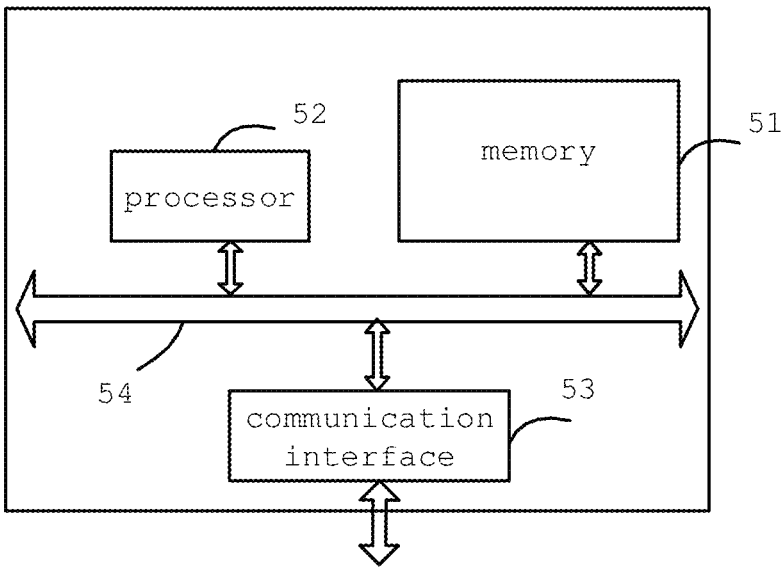
FIG. 5 is a schematic structural diagram of a unit control apparatus according to another embodiment of the present disclosure.

FIG. 5 is a schematic structural diagram of a unit control apparatus according to another embodiment of the present disclosure. As shown in FIG. 5, the unit control apparatus includes a memory 51 and a processor 52.

The memory 51 is used for storing instructions, and the processor 52 is coupled to the memory 51, and the processor 52 is configured to implement the method according to any of the embodiments in FIGS. 1 to 3 based on the instructions stored in the memory.

As shown in FIG. 5, the unit control apparatus also includes a communication interface 53 for information interaction with other devices. At the same time, the unit control apparatus also includes a bus 54 through which the processor 52, the communication interface 53 and the memory 51 communicate with each other.

The memory 51 may include a high-speed RAM memory, and may also include a non-volatile memory, such as at least one disk memory. The memory 51 may also be a memory array. The memory 51 may also be partitioned, and the blocks may be combined into a virtual volume according to certain rules.

Further, the processor 52 may be a central processing unit CPU, or may be an application specific integrated circuit ASIC, or one or more integrated circuits configured to implement the embodiments of the present disclosure.

The present disclosure also relates to a computer-readable storage medium, wherein the computer-readable storage medium stores computer instructions, which, when executed by a processor, implement the method according to any one of the embodiments in FIGS. 1 to 3.

Figure 6:
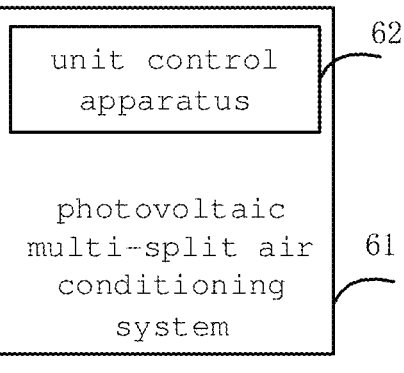
FIG. 6 is a schematic structural diagram of a photovoltaic multi-split air conditioning system according to one embodiment of the present disclosure.

FIG. 6 is a schematic structural diagram of a photovoltaic multi-split air conditioning system according to an embodiment of the present disclosure. As shown in FIG. 6, a photovoltaic multi-split air conditioning system 61 includes a unit control apparatus 62. The unit control apparatus 62 is the unit control apparatus according to any embodiment in FIG. 4 or FIG. 5.

In some embodiments, the functional unit modules described above can be implemented as a general processor, a Programmable Logic Controller (PLC), a Digital Signal Processor (DSP), application specific integrated circuit (ASIC), field-programmable gate array (FPGA) or other programmable logic devices, discrete gate or transistor logic devices, discrete hardware components or any suitable combination thereof.

So far, the embodiments of the present disclosure have been described in detail. In order to avoid shielding of the concept of the present disclosure, some details commonly known in the art are not described. Based on the above description, those skilled in the art can fully understand how to carry out the technical solutions disclosed here.

While some specific embodiments of the present disclosure have been described in detail by way of examples, those skilled in the art should understand that the above examples are for illustrative purposes only and are not intended to limit the scope of the disclosure. Those skilled in the art will appreciate that the above embodiments may be modified or an equivalent substitution may be performed on some of the technical features without departing from the scope and spirit of the present disclosure. The scope of the present disclosure is defined by the appended claims.

What is claimed is:

1. A unit control method, comprising:

detecting a temperature of an inverter module of a current unit at a first preset period; and controlling a demand capacity of the current unit and a photovoltaic power supplied by the current unit not to be increased in a case where the temperature is not less than a first preset threshold, wherein the controlling the demand capacity of the current unit and the photovoltaic power supplied by the current unit not to be increased comprises:

determining whether the temperature is less than a second preset threshold, wherein the second preset threshold is greater than the first preset threshold;

controlling the demand capacity of the current unit and the photovoltaic power supplied by the current unit not to be increased in a case where the temperature is less than the second preset threshold; and distributing a load increment to other units in an operating state except the current unit in a multi-split system in a case where there is the load increment in the multi-split system.

2. The unit control method according to claim 1, further comprising:

determining whether the temperature is less than a third preset threshold in a case where the temperature is not less than the second preset threshold, wherein the third preset threshold is greater than the second preset threshold; and reducing at least one of the demand capacity of the current unit or the photovoltaic power supplied by the current unit based on a preset ratio at a second preset period in a case where the temperature is less than the third preset threshold.

3. The unit control method according to claim 2, wherein the reducing at least one of the demand capacity of the current unit or the photovoltaic power supplied by the current unit based on a preset ratio at a second preset period comprises:

determining whether an electrical power of the current unit is 0; and reducing the photovoltaic power supplied by the current unit based on the preset ratio at the second preset period in a case where the electrical power of the current unit is 0.

4. The unit control method according to claim 3, further comprising:

determining whether the photovoltaic power supplied by the current unit is 0 in a case where the electrical power of the current unit is not 0; and reducing the demand capacity of the current unit based on a preset ratio at the second preset period in a case where the photovoltaic power supplied by the current unit is 0.

5. The unit control method according to claim 4, further comprising:

determining whether the photovoltaic power supplied by the current unit is greater than the electrical power of the current unit in a case where the photovoltaic power supplied by the current unit is not 0; and reducing the photovoltaic power supplied by the current unit based on a preset ratio at the second preset period in a case where the photovoltaic power supplied by the current unit is greater than the electrical power of the current unit.

6. The unit control method according to claim 5, further comprising:

determining whether the photovoltaic power supplied by the current unit is less than the electrical power of the current unit in a case where the photovoltaic power supplied by the current unit is not greater than the electrical power of the current unit; and reducing the demand capacity of the current unit based on a preset ratio at the second preset period in a case where the photovoltaic power supplied by the current unit is less than the electrical power of the current unit.

7. The unit control method according to claim 6, further comprising:

reducing the demand capacity of the current unit and the photovoltaic power supplied by the current unit based on a preset ratio at the second preset period in a case where the photovoltaic power supplied by the current unit is equal to the electrical power of the current unit.

8. The unit control method according to claim 2, further comprising:

determining whether all units in the multi-split system are in the operating state in a case where the temperature is not less than the third preset threshold; and shutting down the current unit, and prohibiting the current unit from starting up within a preset time range in a case where the all units in the multi-split system are in the operating state.

9. The unit control method according to claim 8, further comprising:

distributing a demand capacity of the current unit before shutdown to units in the operating state in the multi-split system based on a unit capacity ratio.

10. The unit control method according to claim 8, further comprising:

shutting down the current unit, and prohibiting the current unit from starting up within a preset time range in a case where part units in the multi-split system are in a standby state;

selecting a unit among units in the standby state as a target unit; and starting up the target unit to replace the current unit, and redistributing a total demand capacity in the multi-split system after the target unit is started up.

11. The unit control method according to claim 4, further comprising:

distributing a decrement of the demand capacity of the current unit to other units in the operating state except the current unit in the multi-split system based on a unit capacity ratio.

12. A non-transitory computer-readable storage medium, wherein the computer-readable storage medium stores computer instructions which, when executed by a processor, implement the method according to claim 1.

13. A unit control apparatus, comprising:

a processor; and a memory coupled to the processor, storing program instructions which, when executed by the processor, cause the processor to:

detect a temperature of an inverter module of a current unit at a first preset period; and control a demand capacity of the current unit and a photovoltaic power supplied by the current unit not to be increased in a case where the temperature is not less than a first preset threshold, wherein the control the demand capacity of the current unit and the photovoltaic power supplied by the current unit not to be increased comprises;

determine whether the temperature is less than a second preset threshold, wherein the second preset threshold is greater than the first preset threshold;

control the demand capacity of the current unit and the photovoltaic power supplied by the current unit not to be increased in a case where the temperature is less than the second preset threshold; and distribute a load increment to other units in an operating state except the current unit in a multi-split system in a case where there is the load increment in the multi-split system.

14. The unit control apparatus according to claim 13, wherein the processor is configured to:

determine whether the temperature is less than a third preset threshold in a case where the temperature is not less than the second preset threshold, wherein the third preset threshold is greater than the second preset threshold; and reduce at least one of the demand capacity of the current unit or the photovoltaic power supplied by the current unit based on a preset ratio at a second preset period in a case where the temperature is less than the third preset threshold.

15. The unit control apparatus according to claim 14, wherein the processor is configured to:

determine whether all units in the multi-split system are in the operating state in a case where the temperature is not less than the third preset threshold; and shut down the current unit, and prohibit the current unit from starting up within a preset time range in a case where the all units in the multi-split system are in the operating state.

16. The unit control apparatus according to claim 15, wherein the processor is configured to:

distribute a demand capacity of the current unit before shutdown to units in the operating state in the multi-split system based on a unit capacity ratio.

17. The unit control apparatus according to claim 15, wherein the processor is configured to:

shut down the current unit, and prohibiting the current unit from starting up within a preset time range in a case where part units in the multi-split system are in a standby state;

select a unit among units in the standby state as a target unit; and start up the target unit to replace the current unit, and redistribute a total demand capacity in the multi-split system after the target unit is started up.

18. A photovoltaic multi-split air conditioning system, comprising a unit control apparatus, the unit control apparatus comprising:

a processor; and a memory coupled to the processor, storing program instructions which, when executed by the processor, cause the processor to-implement-hod-comprising:

detect a temperature of an inverter module of a current unit at a first preset period; and control a demand capacity of the current unit and a photovoltaic power supplied by the current unit not to be increased in a case where the temperature is not less than a first preset threshold, wherein the control the demand capacity of the current unit and the photovoltaic power supplied by the current unit not to be increased comprises;

determine whether the temperature is less than a second preset threshold, wherein the second preset threshold is greater than the first preset threshold;

control the demand capacity of the current unit and the photovoltaic power supplied by the current unit not to be increased in a case where the temperature is less than the second preset threshold; and distribute a load increment to other units in an operating state except the current unit in a multi-split system in a case where there is the load increment in the multi-split system.

\* \* \* \* \*